United States Patent [19]

Wells

[11] Patent Number: 4,574,770
[45] Date of Patent: Mar. 11, 1986

[54] COOKING GRILL GREASE CATCHER

[75] Inventor: L. Paul Wells, Billings, Mont.

[73] Assignee: Roger Wells, Billings, Mont. ; a part interest

[21] Appl. No.: 640,796

[22] Filed: Aug. 14, 1984

[51] Int. Cl.⁴ .......................... A47J 37/00; A47J 27/00
[52] U.S. Cl. .................................... 126/25 R; 99/446; 126/39 K
[58] Field of Search ................ 99/444, 445, 446, 400; 126/25 R, 39 K, 15 R

[56] References Cited

U.S. PATENT DOCUMENTS 3,098,428  7/1963  Maxwell ............................... 99/446
3,989,028 11/1976  Berger ................................... 99/446

FOREIGN PATENT DOCUMENTS 459764  1/1937  United Kingdom ................... 99/446

Primary Examiner—William E. Lyddane
Assistant Examiner—Gerald Anderson
Attorney, Agent, or Firm—Berman, Aisenberg & Platt

[57] ABSTRACT

A cooking apparatus comprises a plurality of grease-catching elements below a rack supporting food being cooked. Each of the grease-catching elements has a heat-shielding member which protects the grease-catching element from radiant energy from a heat source. An air gap is formed between the grease-catching element and the heat-shielding member to allow free flow of air therethrough, thus ensuring that the grease-catching element is properly cooled. By allowing free flow of air through the air space, a very hot heat source may be employed without fear of raising the temperature of the grease-catching elements above the ignition point of grease drippings. The grease-catching apparatus of the invention finds particular utility in an outdoor grill, but may be applied to other types of cooking devices.

9 Claims, 7 Drawing Figures

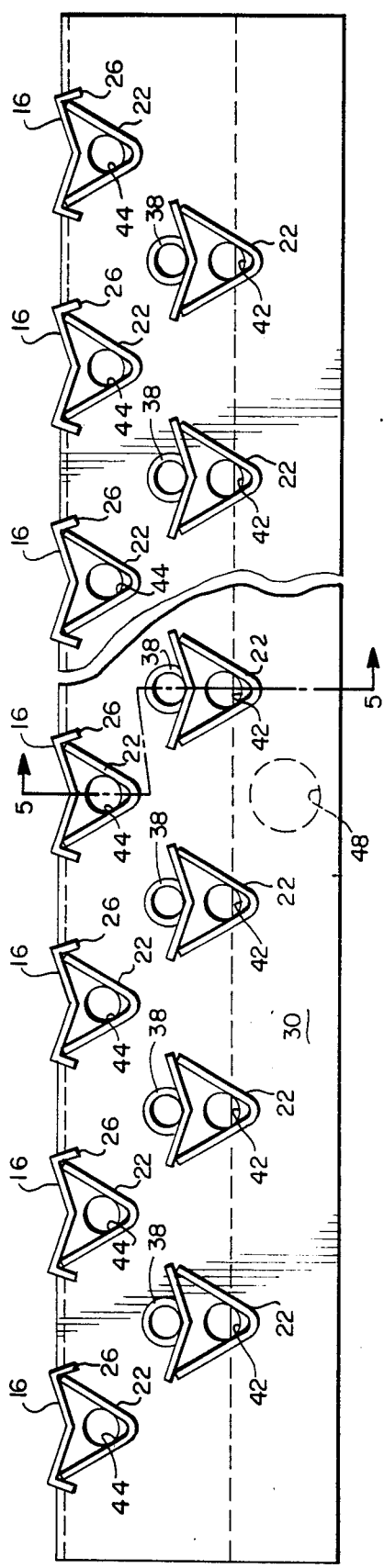
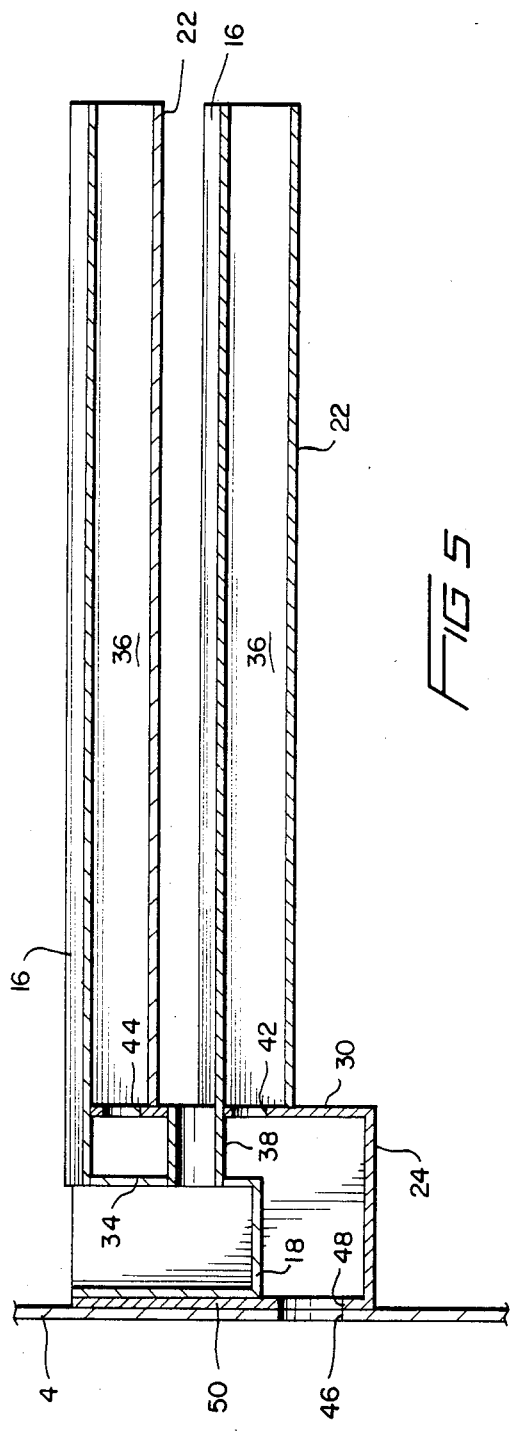

COOKING GRILL GREASE CATCHER

FIELD OF THE INVENTION

This invention relates to the art of apparatus for cooking food.

BACKGROUND ART

It is known to cook food by placing a source of heat beneath the food in such a manner that the energy from the source of heat raises the temperature of the food. In one form, the heat source does not radiate directly onto the food, the cooking being accomplished by simply raising the temperature of the cooking enclosure to raise the temperature of the food. This is the commonly-known process of baking. In another form, radiant energy from the source of heat is allowed to fall directly on the food, thus cooking it by direct radiation. This form is commonly known as broiling.

When the heat source is beneath the cooking food, a problem arises when the food produces grease drippings which fall onto the heat source. The heat source is typically at a temperature above the ignition temperature of the grease drippings, and a grease fire can ensue if the food, such as beef, produces a significant amount of grease.

One solution to the problem has been to provide a tray for intercepting the grease drippings before they impinge upon the source of heat. U.S. Pat. No. 3,443,510 (Norton) teaches one such apparatus. In the Norton device, a plurality of V-shaped elements are placed below gaps formed between inverted V-shaped elements which form a rack for supporting food to be cooked. As the grease drips from the food, it falls through a gap and into a V-shaped element. In a similar vein, U.S. Pat. No. 3,407,723 (Varkala) shows a bacon cooker wherein a lower tray comprises a connected set of valleys and ridges. The ridges engage the food to be cooked, while the valleys collect the grease drippings. U.S. Pat. No. 3,186,331 (Dettling) shows a device for use with an outdoor barbecue grill and includes a plurality of S-shaped strips. Upper, convex portions of the strips support food being cooked, while lower, concave portions of the strips catch grease drippings from the cooking food. Intermediate portions of the S-shaped strips also direct the grease into the concave portions.

A major defect in the prior art grease-catching devices is that the grease troughs themselves are subjected to the energy from the heat source. Thus, the grease trough itself may well reach a temperature sufficient to cause ignition of the caught grease. When this occurs, a substantial fire results which is annoying and may be dangerous.

U.S. Pat. No. 2,811,099 (McGoldrick) shows one attempt to collect drippings in a trough such that the temperature of the trough is kept below the ignition temperature of the drippings. The device shown by McGoldrick does not, however, cook food by use of radiant energy; it relies instead upon a flow of hot air around the food. A V-shaped tray collects drippings, while a deflection plate is located below the tray to prevent radiation from the heat source from striking the tray. The tray and heat source are held in a shell, and ends of the deflection plate are securely attached to planar ends of the shell. Upper edges of the deflection plate are attached to the tray in such a manner that air flow is prevented. By this construction, McGoldrick provides a sealed air chamber between the grease-collecting tray and the deflection plate. Food is cooked by hot air rising around the deflection plate being directed toward the food being cooked. The food is not cooked by radiant energy from the heat source.

SUMMARY OF THE INVENTION

The invention is a cooking apparatus useful for direct-radiation cooking wherein a grease-catching element is kept cool by a heat-shielding element. The grease-catching unit and heat-shielding element are spaced from each other to form an air gap, and air is caused to flow freely through this gap. By this construction, applicant has overcome a major defect in the structure shown by McGoldrick and can employ a higher-temperature heat source and yet maintain the temperature of the grease-catching unit below the ignition temperature of the grease drippings.

In the preferred embodiment, the invention is used in an outdoor grill. A plurality of grease-catching units extend parallel to each other and are spaced to allow radiant energy from the heat source to impinge directly upon the cooking food. Thus, another defect in the structure shown by McGoldrick is overcome since it is often desirable to cook food, such as steaks, in such a manner that radiant energy performs a substantial amount of the cooking process.

An object of this invention is to provide a cooking apparatus wherein a grease-collecting element is maintained below the ignition temperature of grease drippings by the free flow of air between the grease-catching unit and a heat shield.

A further object of this invention is to provide a cooking apparatus wherein food may be cooked by radiant energy and wherein a plurality of grease-collecting elements are maintained below the temperature of ignition of grease drippings.

A still further object of this invention is to provide an apparatus which may be easily attached to an existing outdoor grill and which will permit cooking food by radiant energy while efficiently collecting grease drippings.

BRIEF DESCRIPTION OF THE DRAWINGS

FIG. 4 is an end view of a preferred construction of the invention.

FIG. 5 is a cross-section taken along line 5—5 of FIG. 4.

DETAILED DESCRIPTION OF THE INVENTION

Figure 1:
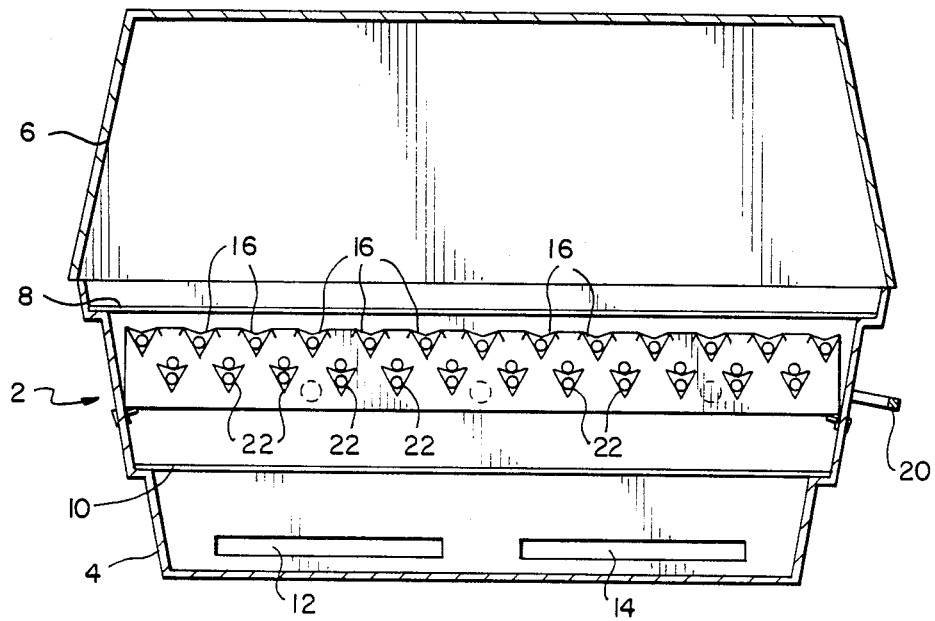
FIG. 1 is a front view of a typical outdoor grill showing the preferred installation of an apparatus in accordance with the invention.

FIG. 1 shows an outdoor grill 2 illustrating a preferred embodiment of the invention. The grill typically contains a lower housing 4 and a lid 6 which are shown in cross section. A rack 8 is placed across the lower housing 4 to support food being cooked. Charcoal, or another heat source, is placed below the rack 8. In the embodiment shown in FIG. 1, a support 10 may be used to hold artificial charcoal briquettes, and gas heating elements 12 and 14 heat the artificial briquettes. In accordance with the preferred embodiment of the invention, a plurality of grease-catching elements 16 are placed in two tiers beneath the rack 8 and above the support 10. The grease-catching elements are preferably elongate troughs which extend outwardly into the lower housing 4. An upper tier of elements 16 comprises a first group which are spaced from each other. A second tier comprises a second group of elements which are also spaced from each other and which are located beneath spaces between elements in the first tier. This construction allows all of the grease falling from food on rack 8 to be caught in the grease-catching troughs. By spacing the grease-catching elements in this manner, radiant energy from coals on support 10 may pass through the spaces between adjacent elements and impinge directly upon the food on rack 8.

Figure 2:
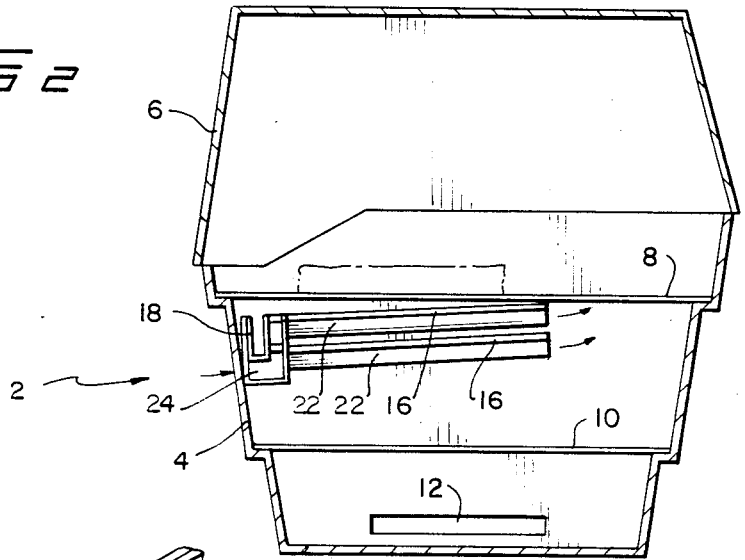
FIG. 2 is a side view of the grill shown in FIG. 1 and shows a side view of the preferred installation of the invention.

FIG. 2 shows a side view of that shown in FIG. 1, and the housing and lid are in cross section. Food resting on rack 8 is shown in phantom lines. Troughs 16 are arranged to catch grease drippings from the food and direct it to a first elongate channel 18 which directs the grease to a spout 20 (FIG. 1) for removal from the cooking apparatus.

Heat shielding members 22 are provided for each grease-collecting element 16 to shield the elements from direct radiation by source 12 and to prevent an extreme temperature by cooling the elements. Each heat-shielding member 22 is spaced from a respective grease-catching element 16 to provide an important air gap therebetween to allow the free flow of air. The air gaps communicate with a second elongate channel 24 in such a manner that air, as illustrated by arrows in FIG. 2, flows into the channel 24, through the air spaces created by the heat-shielding members 22, and outwardly through the ends of the air spaces.

Figure 3:
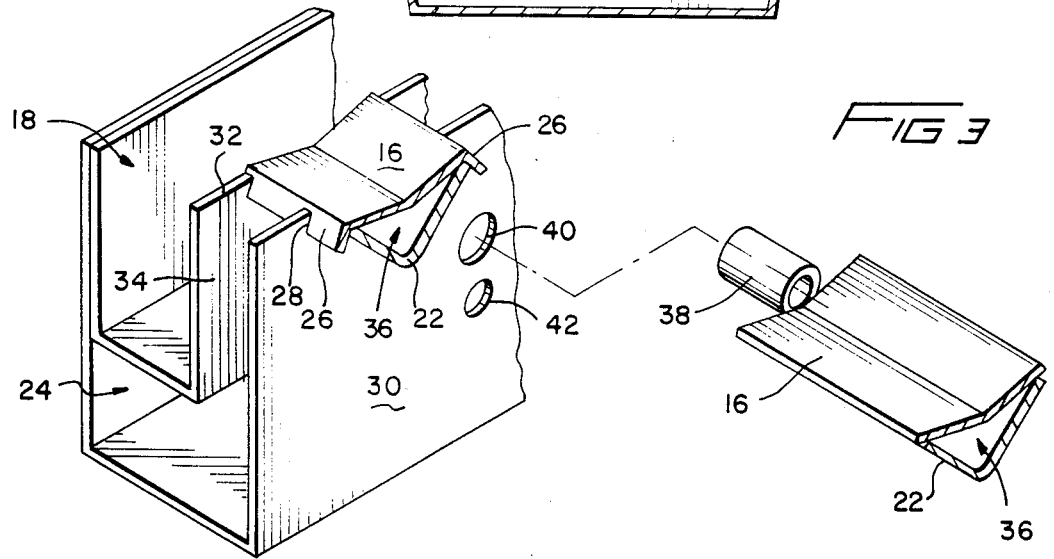
FIG. 3 is an exploded diagram of the preferred grease-collecting and heat-shielding elements of the invention.

FIG. 3 is an exploded diagram of a preferred apparatus which may easily be attached to a known outdoor grill as shown in FIGS. 1 and 2. The first elongate channel 18 is arranged to fit within the second elongate channel 24 to provide a compact structure. A grease-catching element 16 of an upper tier is preferably an elongate trough which is V-shaped in transverse cross-section. Downwardly extending lips 26 engage notches 28 in a sidewall 30 of the second elongate channel 24. The trough 16 extends beyond sidewall 30 and engages an upper edge 32 of a sidewall 34 of the first elongate channel 18. A hole (FIG. 4) in sidewall 30 admits air to an air gap 36 between a grease-catching element 16 and a heat-shielding member 22.

A lower tier of elements is connected in a somewhat different manner. A nipple 38 extends through a hole 40 in sidewall 30 and communicates with a hole (FIG. 4) in sidewall 34 to carry grease from a lower-tier grease-catching element 16 into the first elongate channel 18. A hole 42 in sidewall 30 allows air to flow from the second elongate channel 24 through an air space 36.

FIG. 4 is a front view of the apparatus shown in FIG. 3 and shows a plurality of grease-catching elements 16 and heat-shielding members 22. Holes 44 which supply air to the air spaces in the upper tier are shown in this figure.

FIG. 5 is a side view of the apparatus shown in FIG. 4 and additionally illustrates the cooperation between channels 18 and 24 and lower housing 4 of the outdoor grill 2 shown in FIG. 1. A hole 46 in housing 4 is aligned with a hole 48 in a second sidewall 50 of the second elongate channel 24 to allow air to pass into the channel. Air flowing through the channel passes through holes 42 and 44 into air spaces 36 and out the remote ends of the air spaces. The remote ends of the grease-catching elements and heat shields are preferably above holes 42 and 44 to assist in drawing air through the air gaps.

The invention of FIGS. 1-5 is useful with virtually any type of cooking apparatus, even though it finds particular utility with an outdoor grill of the type shown in FIGS. 1 and 2. The first and second elongate channels, the grease-catching elements, and the heat-shielding members are preferably manufactured as a single unit adapted to be installed on grills of various manufacturers. Thus, the unique construction is extremely versatile.

The use of heat-shielding elements 22 to block direct radiation of the troughs and create an open air space 36 for free-flow of air therethrough ensures that the grease-collecting troughs 16 do not reach ignition temperature of grease drippings. Foods with high fat content, such as beefsteak, may be cooked by a very hot heat source, and yet the grease drippings will not ignite because they are caught by cool troughs 16.

Figure 6:
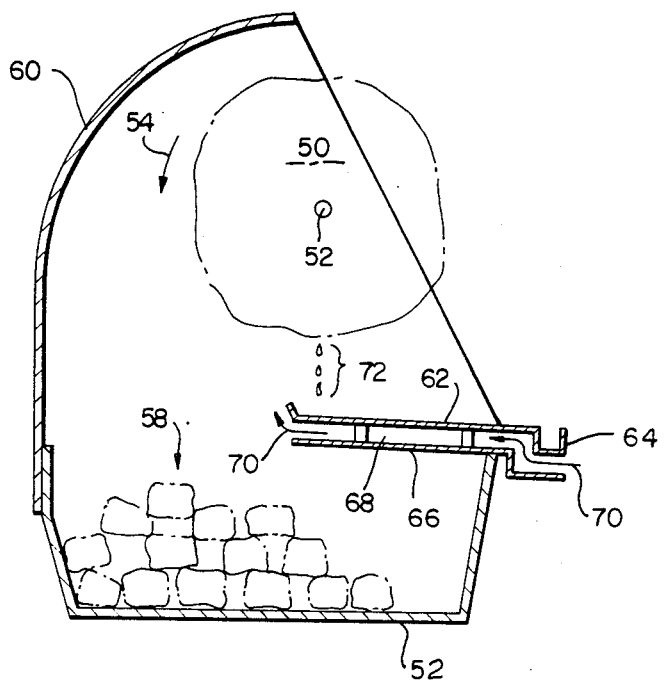
FIG. 6 is an end view of a second embodiment of the invention.

FIG. 6 shows an alternative embodiment of the invention. Food being cooked, such as a pig 50, is mounted on a rotisserie 52 for rotation in a direction indicated by arrow 54. A base 56 holds a source of radiant energy, such as coals 58, for cooking the food. A hood 60 extends upwardly from base 56 and reflects radiant energy from coals 58 onto the rotating food.

A grease-catching pan 62 extends across the bed of coals 58 to catch grease drippings and direct them to trough 64 for subsequent collection in a pail (not shown). A heat shield 66 extends between the coals 58 and pan 62 to prevent direct radiation of the pan 62 and to form air flow channel 68. Air is allowed to flow through channel 68 as indicated by arrows 70 to cool pan 62, whereby the temperature of pan 62 remains below the temperature at which grease will ignite.

Pan 62 preferably extends only partially across the bed of coals 58. Since the food 50 is somewhat cylindrical, most of the grease flows around its periphery and drops off the lowest point as illustrated at 72. In this case, pan 62 would extend just beyond the center line of the rotisserie. Rotation in the direction of arrow 54 contributes to the tendency of the grease to fall into pan 62 and not into the coals 58.

Figure 7:
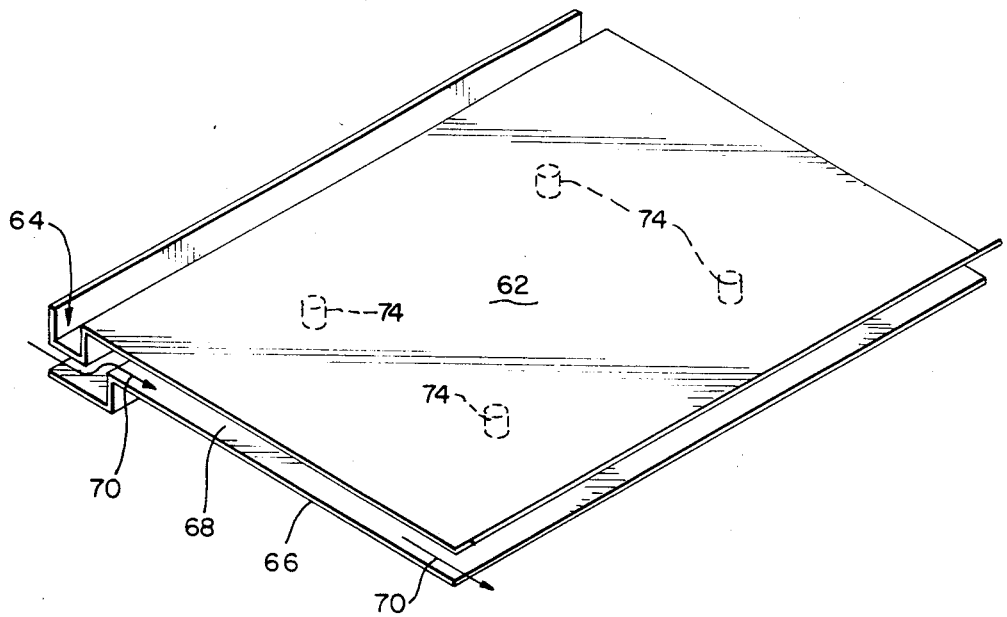
FIG. 7 is a perspective view of a grease-catching pan.

FIG. 7 shows the grease-catching pan of FIG. 6 in perspective. It will be appreciated that pan 62 and shield 66 are preferably made of single pieces of metal, the trough 64 and air channel entry being bent portions of the pieces. Spacers 74 are used to maintain the air flow channel 68 between the pan 62 and shield 66 and can be pieces of cylindrical pipe, or the like.

The arrangement shown in FIGS. 6 and 7 has been shown to be quite useful in preventing grease fires normally associated with rotisserie cooking. Energy from coals 58 impinges directly on the food because pan 62 extends only partly across the bed of coals 58, and the food is evenly radiated because it rotates. In the preferred arrangement of a rotisserie, pan 62 is continuous along the length of the food, in contrast to the spaced fingers described above with respect to FIGS. 1-5.

The flow of air through air channel 68 prevents grease caught by pan 62 from burning even though the coals 58 are quite hot and would raise the temperature of the pan 62 beyond the ignition temperature in the absence of the air flow. Use of extremely hot coals allows the food to be cooked faster than in prior art rotisseries without fear of a dangerous grease fire.

It will also be appreciated that the grease-catching channel and air channel shown in FIG. 2 may be located on the exterior of the barbecue without altering the function of the invention.

Modifications of the invention within the scope of the appended claims will be apparent to those of ordinary skill in the art.

What is claimed is:

1. Cooking apparatus comprising grease-catching means for catching grease from cooking food, shielding means beneath said grease-catching means for shielding a bottom surface of said grease-catching means from direct radiation from a source of radiant energy, said shielding means being spaced from said bottom surface to provide an air gap which permits the free flow of air through said air gap to cool said grease-catching means, and cool air supply means for supplying cool air from a region remote from said source of radiant energy and beyond an exterior wall of said apparatus to one end of said air gap.

2. Cooking apparatus according to claim 1 wherein said grease-catching means comprises a plurality of elongate elements which are concave in transverse cross-section, and said shielding means comprises a plurality of elongate members, each of said plurality of elongate members being located to shield a respective one of said elongate elements.

3. Cooking apparatus according to claim 2 further comprising grease-collecting means, wherein said grease-catching means is in communication with said grease-collecting means whereby grease from cooking food is caught by said grease-catching means and directed to said grease-collecting means.

4. Apparatus according to claim 3 wherein said cool air supply means comprises a first elongate channel having a plurality of apertures in a side wall thereof, each of said apertures communicating with one of said air gaps, and said grease-collecting means comprises a second elongate channel within said first elongate channel, each of said elongate elements being in communication with said second elongate channel to allow grease caught by one of said elongate elements to flow into said second elongate channel.

5. Cooking apparatus according to claim 4 wherein upper surfaces of said elongate elements are inclined toward said grease-catching means.

6. Cooking apparatus according to claim 2 further comprising rack means for supporting said food, and heat producing means for cooking said food and comprising said source of radiant energy, wherein said grease catching means is below said rack means and said shielding means is between said grease catching means and said heat producing means.

7. Apparatus according to claim 6 wherein said plurality of elongate elements extend in parallel directions and are arranged in first and second tiers which are spaced from said rack means by respective unequal distances, said first tier being formed by a first group of said elongate elements spaced from each other, and said second tier being formed by a second group of said elongate elements spaced from each other, the elongate elements of said second group being vertically below spaces between said elongate elements of said first group.

8. Apparatus according to claim 1 wherein said grease-catching means is a generally flat pan which extends substantially along the length of said source of radiant energy and partially across said source of radiant energy, and said shielding means comprises a generally flat element having a portion with a configuration which substantially matches that of said pan.

9. Apparatus according to claim 8 wherein each of said pan and said element is made of a single piece of metal.

* * * * *